United States Patent
Eliash et al.

(10) Patent No.: US 12,318,850 B2
(45) Date of Patent: Jun. 3, 2025

(54) METHOD FOR REMOVING A PORTION OF A STRUCTURE

(71) Applicants: Michael R. Eliash, Huntington, NY (US); Marc Vento, Locust Valley, NY (US)

(72) Inventors: Michael R. Eliash, Huntington, NY (US); Marc Vento, Locust Valley, NY (US)

(73) Assignee: CORE RETENTION EQUIPMENT LLC, Denver, CO (US)

( * ) Notice: Subject to any disclaimer, the term of this patent is extended or adjusted under 35 U.S.C. 154(b) by 951 days.

(21) Appl. No.: 17/356,819

(22) Filed: Jun. 24, 2021

(65) Prior Publication Data
US 2022/0241874 A1    Aug. 4, 2022

Related U.S. Application Data

(62) Division of application No. 17/163,962, filed on Feb. 1, 2021, now Pat. No. 11,065,696.

(51) Int. Cl.
*B23B 51/04*    (2006.01)
*B28D 1/04*    (2006.01)

(52) U.S. Cl.
CPC ........ *B23B 51/044* (2013.01); *B23B 2226/75* (2013.01); *B28D 1/041* (2013.01)

(58) Field of Classification Search
CPC .... B23B 51/044; B23B 2226/75; B28D 1/041
See application file for complete search history.

(56) References Cited

U.S. PATENT DOCUMENTS

| 6,092,964 A | 7/2000 | El Dessouky et al. |
| 6,152,812 A * | 11/2000 | Sung ............... B28D 1/041 451/178 |
| 8,152,421 B2 | 4/2012 | Yagishita |
| 9,849,553 B2 | 12/2017 | Bialy et al. |
| 2014/0334891 A1* | 11/2014 | Sandler ............... B23B 41/00 408/72 R |

(Continued)

FOREIGN PATENT DOCUMENTS

| CN | 103822826 A | 5/2014 |
| EP | 0 791 424 B1 | 6/2003 |

(Continued)

OTHER PUBLICATIONS

International Search Report and Written Opinion, issued on PCT Patent Application No. PCT/US2022/014614, dated May 4, 2022.

(Continued)

*Primary Examiner* — Cathleen R Hutchins
*Assistant Examiner* — Ronald R Runyan
(74) *Attorney, Agent, or Firm* — Fox Rothschild LLP

(57) ABSTRACT

A method for removing a portion of a structure is disclosed. The method includes attaching a first elongated member to the portion of the structure, receiving a second elongated member of a drilling assembly with the first elongated member, drilling into the structure with the drilling assembly while receiving the second elongated member with the first elongated member, and removing the portion of the structure that is attached to the first elongated member while urging the first elongated member with the second elongated member.

12 Claims, 10 Drawing Sheets

(56) References Cited

U.S. PATENT DOCUMENTS

2014/0369774 A1    12/2014    Matesic

FOREIGN PATENT DOCUMENTS

| EP | 3 277 914 B1 | 12/2019 | |
|---|---|---|---|
| ES | 2244885 T3 | 12/2005 | |
| FR | 0791424 A2 * | 8/1997 | ............ B23B 51/04 |
| JP | H11 90922 A | 4/1999 | |

OTHER PUBLICATIONS

Extended European Search Report and European Search Opinion, dated Nov. 11, 2024, issued in corresponding European Application No. 22746832.9.

* cited by examiner

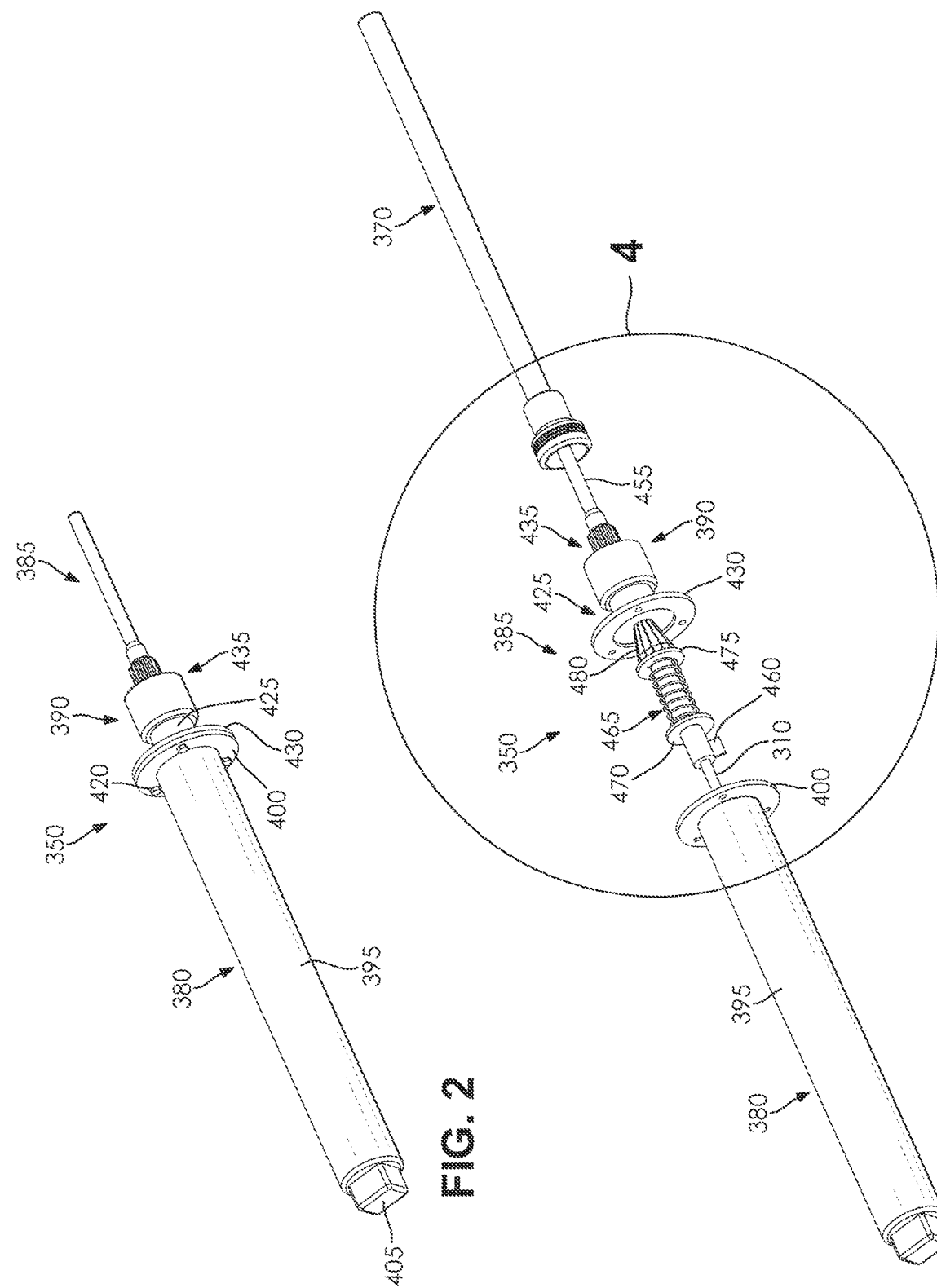

METHOD FOR REMOVING A PORTION OF A STRUCTURE

CROSS-REFERENCE TO RELATED APPLICATIONS

This application is a divisional of U.S. Non-Provisional Utility patent application Ser. No. 17/163,962, filed Feb. 1, 2021, and entitled "System, Apparatus, and Method for Removing a Portion of a Structure", the entire disclosure of which is hereby incorporated herein by reference.

TECHNICAL FIELD

The present disclosure is directed to a system, apparatus, and method for removal, and more particularly, to a system, apparatus, and method for removing a portion of a structure.

BACKGROUND OF THE DISCLOSURE

Evaluation of structural systems typically involves removing a portion such as a core from the structure so that the core can be tested to confirm the strength of the materials forming the structure. For example, one or more concrete cores are typically removed from a concrete structure and then tested to verify the assumed structural strength of materials used in the structure. Also for example, a core may be removed for the purpose of a utility penetration or to provide access such as for personnel or equipment.

A disadvantage in conventional coring techniques involves locations of a structure disposed above vulnerable or high traffic areas such as, for example, a bridge deck located above another roadway carrying vehicular or pedestrian traffic. This is because when conventional coring techniques are used to remove a core, the core typically falls to the ground. Accordingly, conventional coring techniques present a danger in many situations because the extracted core may fall into a roadway carrying traffic or another vulnerable area that may be damaged by the falling core.

The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to a method for removing a portion of a structure. The method includes attaching a first elongated member to the portion of the structure, receiving a second elongated member of a drilling assembly with the first elongated member, drilling into the structure with the drilling assembly while receiving the second elongated member with the first elongated member, and removing the portion of the structure that is attached to the first elongated member while urging the first elongated member with the second elongated member.

In another aspect, the present disclosure is directed to a drilling assembly configured to be received by a first elongated member attached to a portion of a structure and to remove the portion of the structure. The drilling assembly includes a second elongated member including a first cavity configured to receive the first elongated member, an outer shaft assembly including a second cavity configured to receive the second elongated member, a shaft chuck that is removably attachable to the outer shaft assembly and that includes a third cavity, and a collar member that is disposed on the second elongated member and that is configured to be received in the third cavity.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

FIG. 2 is a side illustration of at least some exemplary embodiments of the present disclosure;

FIG. 3 is a side illustration of at least some exemplary embodiments of the present disclosure;

DETAILED DESCRIPTION AND INDUSTRIAL APPLICABILITY

The exemplary disclosed system, apparatus, and method may be used to remove a portion of a structural assembly while retaining the portion during and after removal. For example, the exemplary disclosed system, apparatus, and method may be used to remove a portion of a structural assembly such as a core while retaining the portion so that the portion does not fall to an area below a removal location.

Figure 1:
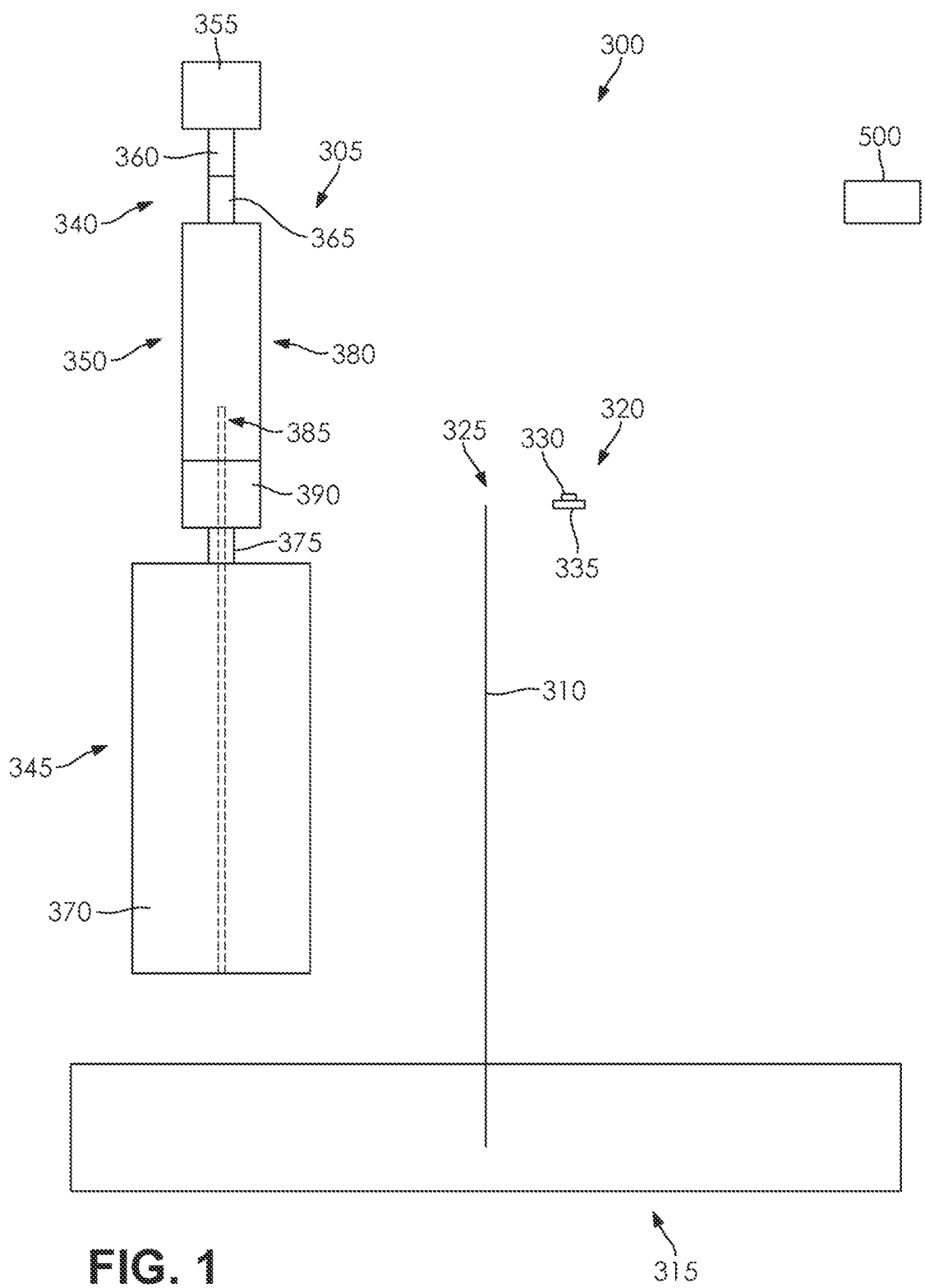
FIG. 1 is a schematic illustration of at least some exemplary embodiments of the present disclosure.

FIG. 1 illustrates an exemplary embodiment of the exemplary disclosed system, apparatus, and method. System 300 may include an assembly 305 that may be removably received by an elongated member 310 that may be attached to a structural assembly 315. Assembly 305 may be a drilling assembly.

Structural assembly 315 may be any suitable structural assembly for use with assembly 305. For example, structural assembly 315 may be a reinforced concrete structure, a prestressed concrete structure, or a post-tensioned concrete structure. Structural assembly 315 may be a wood structure, a metal (e.g., steel) structure, and/or any other suitable structural system. In at least some exemplary embodiments, structural assembly 315 may be a bridge deck, a structural slab such as a bridge or building slab, or any other suitable structure. Structural assembly 315 may be a concrete bridge deck that is located above a roadway or other area in which pedestrians and/or vehicles may be located and/or may travel.

Elongated member 310 may be any suitable structural member that may be attached to structural assembly 315. Elongated member 310 may be a rod such as a threaded rod. Elongated member 310 may be attached to structural assembly 315 by any suitable method such as, for example, by drilling and epoxy. For example, an aperture (e.g., hole) may be provided or drilled and then elongated member 310 may be adhered or epoxied (e.g., may also be adhered via an expansion anchor in lieu of epoxy) in the aperture and/or fixedly attached by any other suitable technique. Elongated member 310 may thereby be fixedly attached to structural assembly 315. In at least some exemplary embodiments, elongated member 310 may be a threaded rod that is drilled and epoxied to structural assembly 315 at a location (e.g., at a center of a location) to be cored by assembly 305. In at least some exemplary embodiments, for relatively smaller cores or operations in which a user is not in a position to wait for epoxy to dry, a drop-in anchor may be used in place of epoxy.

Elongated member 310 may include a fastener assembly 320 that may be removably attached to elongated member 310 at an end portion 325 that may be distal from the end portion of elongated member 310 attached to structural assembly 315. Fastener assembly 320 may be any suitable assembly for fastening a portion of assembly 305 to elongated member 310. For example, fastener assembly 320 may include a fastener 330 (e.g., a threaded fastener such as a threaded nut) and/or a washer 335.

Assembly 305 may include a drill assembly 340, a core assembly 345, and a shaft assembly 350. Core assembly 345 may be attached to drill assembly 340 via shaft assembly 350. Drill assembly 340, core assembly 345, and shaft assembly 350 may operate to core structural assembly 315 to remove and retain a portion (e.g., a core) of structural assembly 315.

Components of assembly 305 may be formed from any suitable materials for providing an apparatus for removing a portion of structural assembly 315. Components of assembly 305 may be formed from structural material. For example, components of assembly 305 may be formed from metal, plastic material, composite material, and/or any other suitable structural material. In at least some exemplary embodiments, components of assembly 305 may be formed from structural metal such as steel.

Drill assembly 340 may include a drill 355, a drill chuck 360, and a drill adapter 365. Drill assembly 340 may include drill rig components such as a motor, an adjustable structural assembly for supporting and positioning drill 355, and any other suitable components for allowing assembly 305 to remove a portion of structural assembly 315. Drill assembly 340 may be powered by any suitable power source such as, for example, electrical, hydraulic, and/or pneumatic power sources. Assembly 305 may be water-cooled and may draw water from a storage tank or other water source during a drilling operation. Drill 355 may be attached to drill chuck 360, which may be attached to drill adapter 365. Drill chuck 360 and drill adapter 365 may include any suitable fastening components such as, for example, threading, press-fit fasteners, clamps, and/or any other suitable mechanical fasteners. Drill 355 may thereby be operably connected (e.g., rotatably connected) to shaft assembly 350 via drill chuck 360 and drill adapter 365.

Core assembly 345 may include a core member 370 and a core adapter 375. Core adapter 375 may operably connect core member 370 to shaft assembly 350. Core member 370 may be any suitable member for removing a portion of structural assembly 315. For example, core member 370 may be a core bit. Core member 370 may include abrasive material at one or more surfaces of core member 370 used to drill into surface portions such as a surface portion of structural assembly 315. For example, drilling surface portions of core member 370 may include abrasive material such as industrial diamond grit. Core adapter 375 may be generally similar to drill adapter 365 and may attach core assembly 345 to shaft assembly 350.

As illustrated in FIGS. 2-7, shaft assembly 350 may include an outer shaft assembly 380, an inner shaft assembly 385, and a shaft chuck 390. Shaft chuck 390 may be attached to outer shaft assembly 380. Inner shaft assembly 385 may be received in outer shaft assembly 380 and shaft chuck 390 (e.g., as well as being received in core adapter 375 and core member 370).

Figure 4:
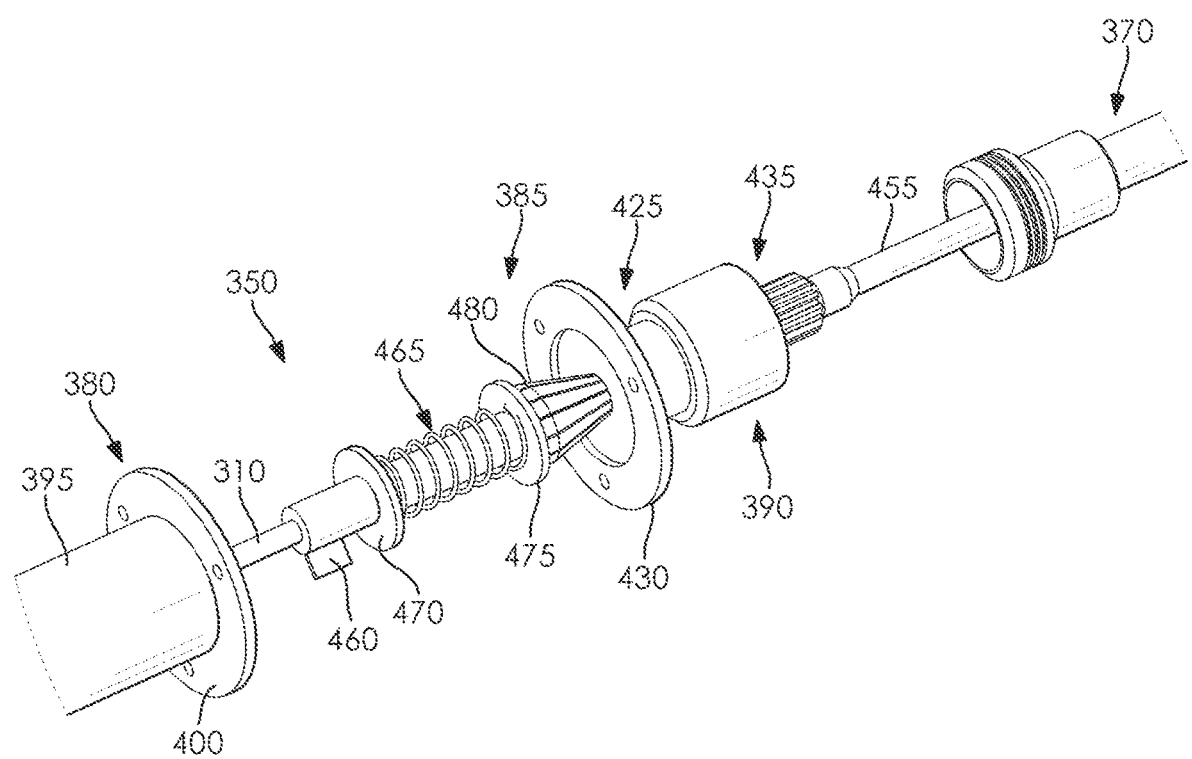
FIG. 4 is a side illustration of at least some exemplary embodiments of the present disclosure.
Figure 5:
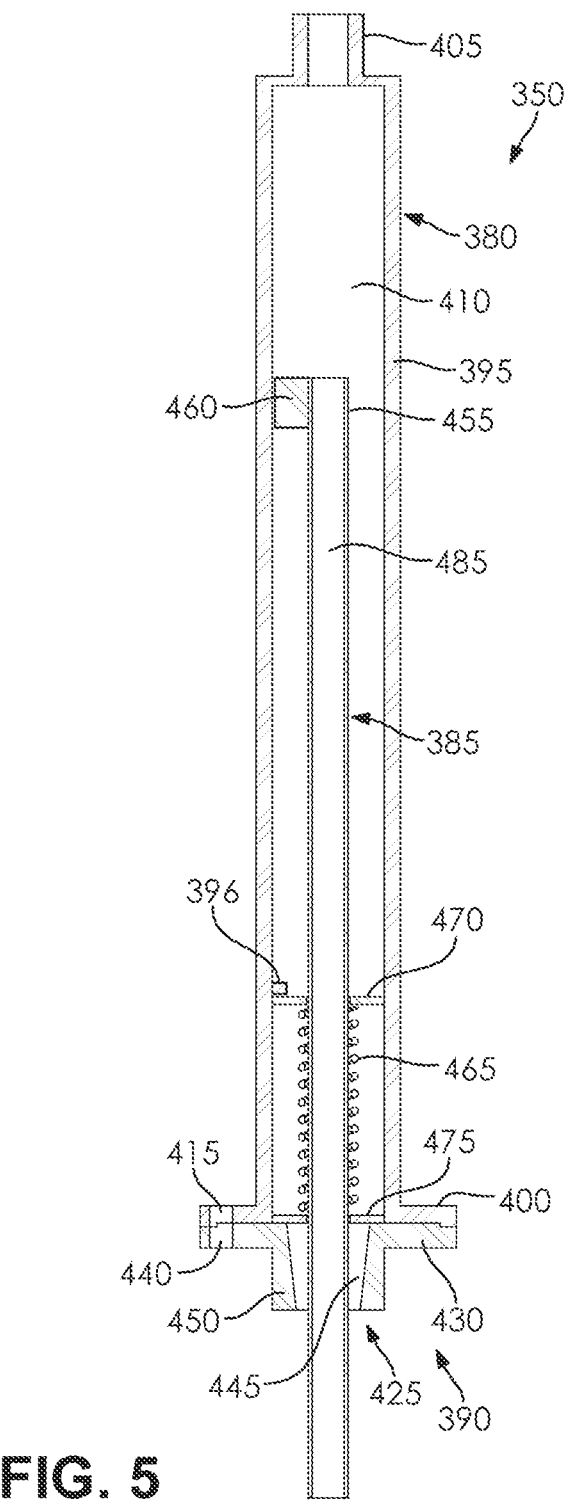
FIG. 5 is a sectional illustration of at least some exemplary embodiments of the present disclosure.
Figure 6:
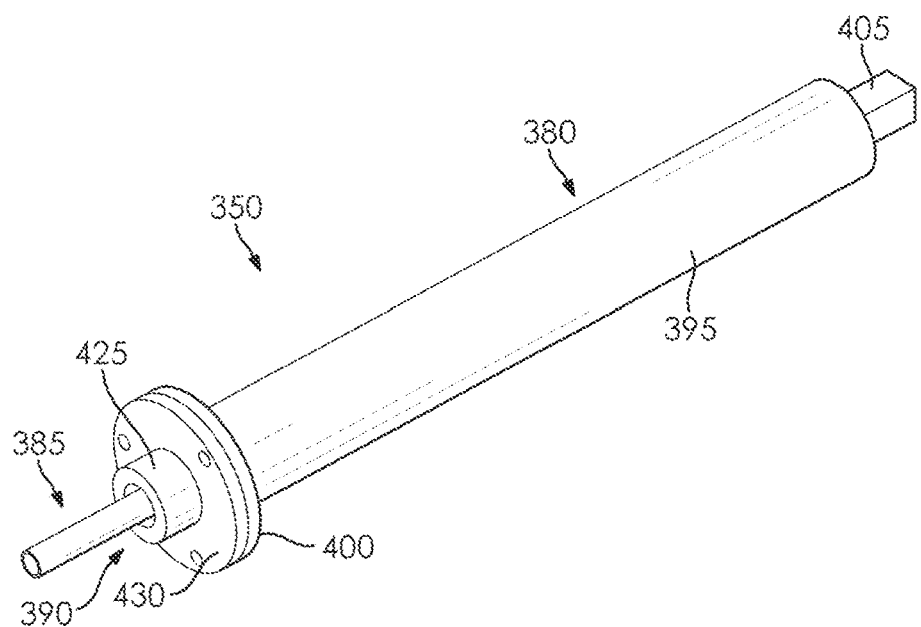
FIG. 6 is a perspective illustration of at least some exemplary embodiments of the present disclosure.
Figure 7:
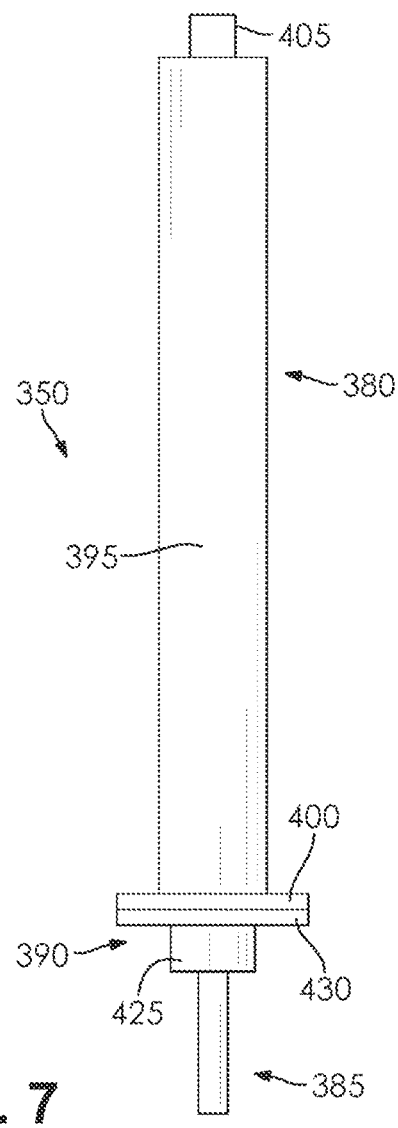
FIG. 7 is a side illustration of at least some exemplary embodiments of the present disclosure.

As illustrated in FIGS. 2-7, outer shaft assembly 380 may include a body member 395, a protruding portion 400, and an attachment member 405. Protruding portion 400 may be disposed at a first end portion of body member 395, and attachment member 405 may be disposed at a second end portion of body member 395. Body member 395, protruding portion 400, and attachment member 405 may be formed from any suitable structural material such as metal (e.g., structural steel or any other suitable metal). Body member 395 may be an elongated structural shape such as a hollow structural member. For example, body member 395 may be a structural tube, a cylinder, or any other suitable structural shape forming a cavity 410 for example as illustrated in FIG. 5. Cavity 410 may receive inner shaft assembly 385 for example as described herein. In at least some exemplary embodiments, body member 395 may include a plurality (e.g., three) of protrusions (e.g., pins 396) disposed inside of body member 395, which may protrude inwardly (e.g., disposed 120 degrees apart from each other) above the exemplary disclosed plate member (e.g., plate member 470 described herein). The exemplary disclosed pins 396 may push down on the exemplary disclosed plate member (e.g., plate member 470 described herein) during the exemplary disclosed operation to compress the exemplary disclosed urging member (e.g., urging member 465) described herein.

Attachment member 405 may be an integral portion of body member 395 or may be attached to body member 395 by any suitable technique such as welding, bolting, or any other suitable technique. Attachment member 405 may be formed from any suitable structural material for example as described above. Attachment member 405 may be configured to be attached to drill adapter 365. For example, attachment member 405 may include threading, clamping, or any other suitable fastener component that may be attached (e.g., removably attached) to drill adapter 365 in order to attach drill assembly 340 and shaft assembly 350.

Protruding portion 400 may be an integral portion of body member 395 or may be attached to body member 395. Protruding portion 400 may be formed from any suitable structural material for example as described above. Protruding portion 400 may be a structural flange that may be configured (e.g., sized) to be attached to a corresponding portion of shaft chuck 390. Protruding portion 400 may include a plurality of apertures 415 that may receive a plurality of fasteners 420 so that protruding portion 400 may be fastened to a portion of shaft chuck 390 for example as illustrated in FIGS. 2 and 5.

Figure 9A:
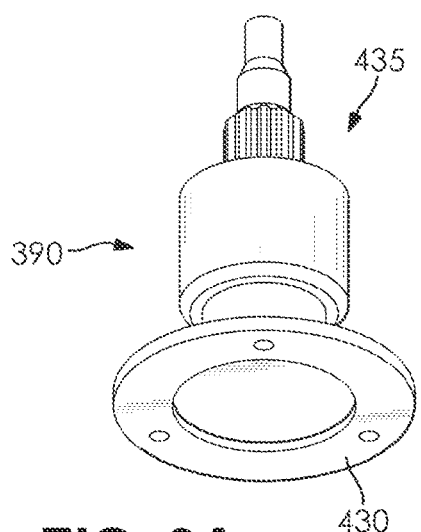
FIG. 9A is a perspective illustration of at least some exemplary embodiments of the present disclosure.
Figure 9B:
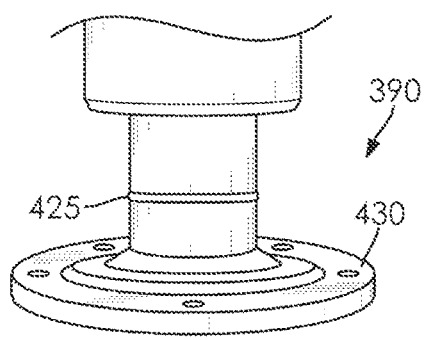
FIG. 9B is a perspective illustration of at least some exemplary embodiments of the present disclosure.
Figure 9C:
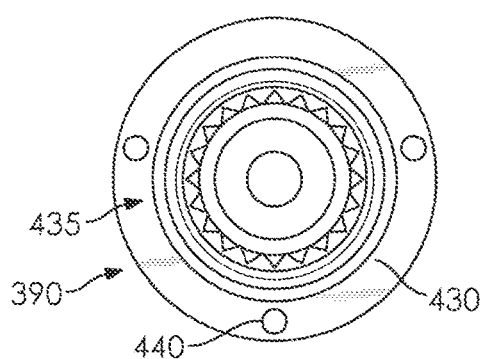
FIG. 9C is a top illustration of at least some exemplary embodiments of the present disclosure.

As illustrated in FIGS. 2-7, 9A, 9B, 9C, and 9D, shaft chuck 390 may include a body member 425, a protruding portion 430, and an attachment assembly 435. Protruding portion 430 may be disposed at a first end portion of body member 425, and attachment assembly 435 may be disposed at a second end portion of body member 425. Body member 425, protruding portion 430, and attachment assembly 435 may be formed from any suitable structural material such as metal (e.g., structural steel or any other suitable metal), plastic, composite material, and/or any other suitable structural material. Attachment assembly 435 may include any suitable components for attaching (e.g., removably attaching) shaft chuck 390 to core adapter 375 such as, for example, threading, spline components, and any other suitable attachment components (e.g., for example as illustrated in FIG. 9C).

Protruding portion 430 may be an integral portion of body member 425 or may be attached to body member 425. Protruding portion 430 may be formed from any suitable structural material for example as described above. Protruding portion 430 may be a structural flange that may be configured (e.g., sized) to be attached to protruding portion 400 of outer shaft assembly 380. Protruding portion 430 may include a plurality of apertures 440 that may receive fasteners 420 so that protruding portion 430 may be fastened to protruding portion 400 for example as illustrated in FIGS. 2 and 5.

Figure 9D:
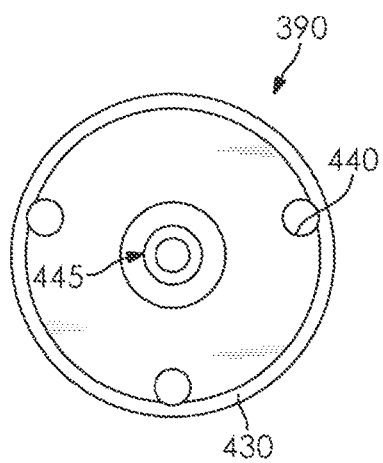
FIG. 9D is a bottom illustration of at least some exemplary embodiments of the present disclosure.

As illustrated in FIG. 5, body member 425 may include a cavity 445 that may be formed by one or more wall members 450 of body member 425. One or more wall members 450 may form an annular wall. One or more wall members 450 may be configured to taper inward in a direction moving from protruding portion 430 toward attachment assembly 435 and core adapter 375 that may be attached to attachment assembly 435. Cavity 445 may thereby taper inward for example as illustrated in FIGS. 5 and 9D, with a diameter of cavity 445 being reduced in the direction moving from protruding portion 430 toward attachment assembly 435 and core adapter 375 that may be attached to attachment assembly 435. Cavity 445 may be configured to receive a portion of inner shaft assembly 385 for example as described below.

Figure 8:
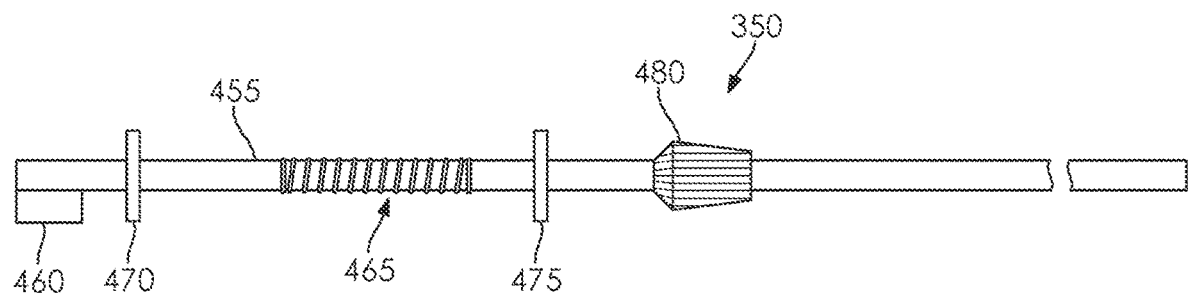
FIG. 8 is a side illustration of at least some exemplary embodiments of the present disclosure.

As illustrated in FIGS. 4, 5, and 8, inner shaft assembly 385 may include an elongated member 455, a protrusion 460, an urging member 465, a plate member 470, a plate member 475, and a collar member 480. Urging member 465, plate member 470, plate member 475, and collar member 480 may be received by elongated member 455. Elongated member 455, protrusion 460, urging member 465, plate member 470, plate member 475, and collar member 480 may be formed from any suitable structural material such as metal (e.g., structural steel or any other suitable metal), plastic, composite material, and/or any other suitable structural material.

Elongated member 455 may be an elongated structural shape such as a hollow structural member. For example, elongated member 455 may be a structural tube, a cylinder, or any other suitable structural shape forming a cavity 485 for example as illustrated in FIG. 5. Cavity 485 may receive elongated member 310 for example as described herein. Protrusion 460 may be for example a tab. Protrusion 460 may be attached to an exterior surface portion of elongated member 455 by any suitable technique such as, for example, welding, adhesive, and/or any other suitable attachment technique (e.g., or may be integrally formed with elongated member 455). Protrusion 460 may for example engage and/or abut protrusions, walls, recesses, and other features disposed at an interior surface of body member 395 forming cavity 410 to guide a relative movement between inner shaft assembly 385 and outer shaft assembly 380 and/or to prevent a portion of elongated member 455 having protrusion 460 from passing through cavity 445. In at least some exemplary embodiments, protrusions (e.g., pins 396) disposed on an interior surface of body member 395 may engage urging member 465, plate member 470, and plate member 475, which may force collar member 480 into tapered cavity 445, thereby compressing collar member 480 onto elongated member 455. In at least some exemplary embodiments (e.g., if for some reason during extraction collar member 480 releases elongated member 455), elongated member 455 may initially pass through cavity 445 but then may stop passing through cavity 445 when protrusion 460 engages urging member 465, plate member 470, and plate member 475 again. This may, for example, provide an additional mechanism for preventing a dropping of the core.

Urging member 465 may be any suitable member that may be retained on elongated member 455 and that may be compressed. For example, urging member 465 may be any suitable potential-energy-storing member. In at least some exemplary embodiments, urging member 465 may be a spring such as a compression spring, a Belleville spring, or any other suitable type of spring. For example as illustrated in FIGS. 4, 5, and 8, urging member 465 may be disposed between plate members 470 and 475. Plate members 470 and 475 may be any suitable members for spreading or distributing force or load. For example, plate members 470 and 475 may be any suitable hardware such as washers.

Collar member 480 may be any suitable member for forming a collar around elongated member 455 and applying a compressive force to elongated member 455. For example, collar member 480 may be a chuck or collet. As illustrated in FIGS. 4 and 8, collar member 480 may include a tapered exterior surface that may be configured to be received in cavity 445 of shaft chuck 390. Collar member 480 may be shaped to have an exterior surface that fits and abuts against surfaces of one or more wall members 450 forming cavity 445. When collar member 480 is received in cavity 445 and urged against one or more wall members 450, collar member 480 may be compressed and may apply compressive force against an exterior surface of elongated member 455 to compress elongated member 455 (e.g., and to compress elongated member 310 that may be received in elongated member 455).

Returning to FIG. 1, system 300 may include a controller 500 for controlling some or substantially all drilling operations of system 300. Controller 500 may control an operation of assembly 305. Controller 500 may include for example a micro-processing logic control device or board components. Also for example, controller 500 may include input/output arrangements that allow it to be connected (e.g., via wireless and/or electrical connection) to other components of system 300. Controller 500 may communicate with other components (e.g., drill 355) of system 300 by any suitable communication technique (e.g., wire or wireless). Controller 500 may receive input from and provide output to any suitable user interface via direct communication (e.g., via a user interface that may be attached, box-mounted, or remotely located), WiFi, wireless communication (e.g., CDMA, GSM, 3G, 4G, and/or 5G), direct communication (e.g., wire communication), Bluetooth communication coverage, Near Field Communication (e.g., NFC contactless communication such as NFC contactless methods), radio frequency communication (e.g., RF communication such as short-wavelength radio waves, e.g., UHF waves), and/or any other desired communication technique. Controller 500 may operate using one or more modules that may be partially or substantially entirely integrated with one or more components of system 300. The one or more modules may be software modules and may include computer-executable code stored in non-volatile memory. The one or more modules may operate using a processor (e.g., controller 500). The one or more modules may store data and/or be used to control some or all of the exemplary disclosed processes described herein.

Controller 500 may communicate with any suitable user interface for receiving input and/or providing output (e.g., raw data or other desired information) to a user of system 300. The user interface may be, for example, a touchscreen device (e.g., a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user device or interface designed to work specifically with other components of system 300, and/or any other suitable user device or interface. For example, the user interface may include a touchscreen device of a smartphone or handheld tablet. For example, the user interface may include a display that may include a graphical user interface to facilitate entry of input by a user and/or receiving output. For example, system 300 may provide notifications to a user via output transmitted to the user interface (e.g., and/or other components of system 300). The user interface may also be any suitable accessory such as a smart watch, Bluetooth headphones, and/or other suitable devices that may communicate with components of system 300 (e.g., controller 500).

The exemplary disclosed system, apparatus, and method may be used in any suitable application involving new or existing structural systems. For example, the exemplary disclosed system, apparatus, and method may be used in any suitable application for construction work involving new or existing structures. The exemplary disclosed system, apparatus, and method may be used in any suitable application for removing a portion of a structure such as removing a core from a structure. For example, the exemplary disclosed system, apparatus, and method may be used in removing a core from a concrete structure at a location disposed above an area carrying pedestrian or vehicular traffic or disposed above any other suitable sensitive or vulnerable area that may be damaged by a falling core.

Figure 10:
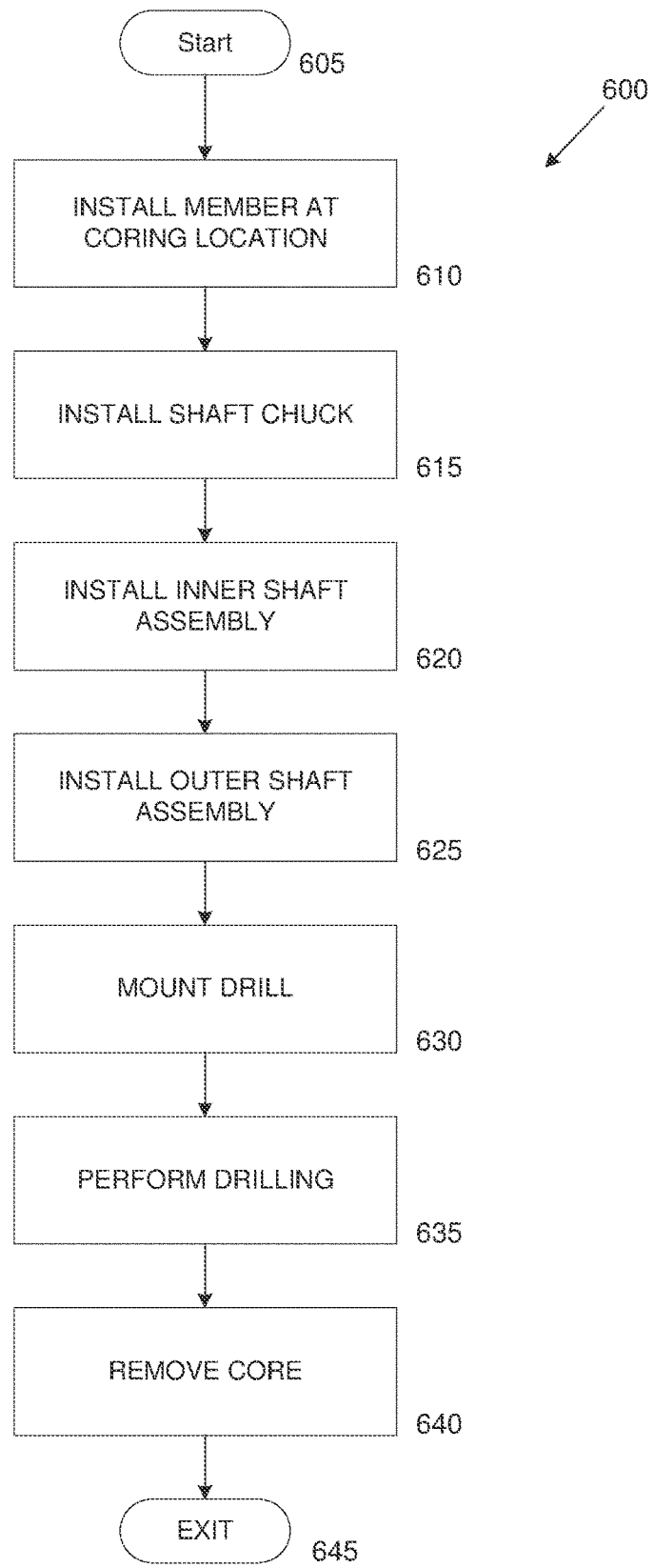
FIG. 10 illustrates an exemplary process of at least some exemplary embodiments of the present disclosure.

FIG. 10 illustrates an exemplary operation of the exemplary disclosed system. Process 600 may be a method for removing a portion of a structural system. Process 600 begins at step 605. At step 610, a location to be cored may be identified by a user of system 300. Elongated member 310 may be attached to structural assembly 315 for example as illustrated in FIG. 1. Elongated member 310 may be drilled and adhered (e.g., epoxied) into structural assembly 315. For example, elongated member 310 may be attached at a center of a coring location.

Figure 11:
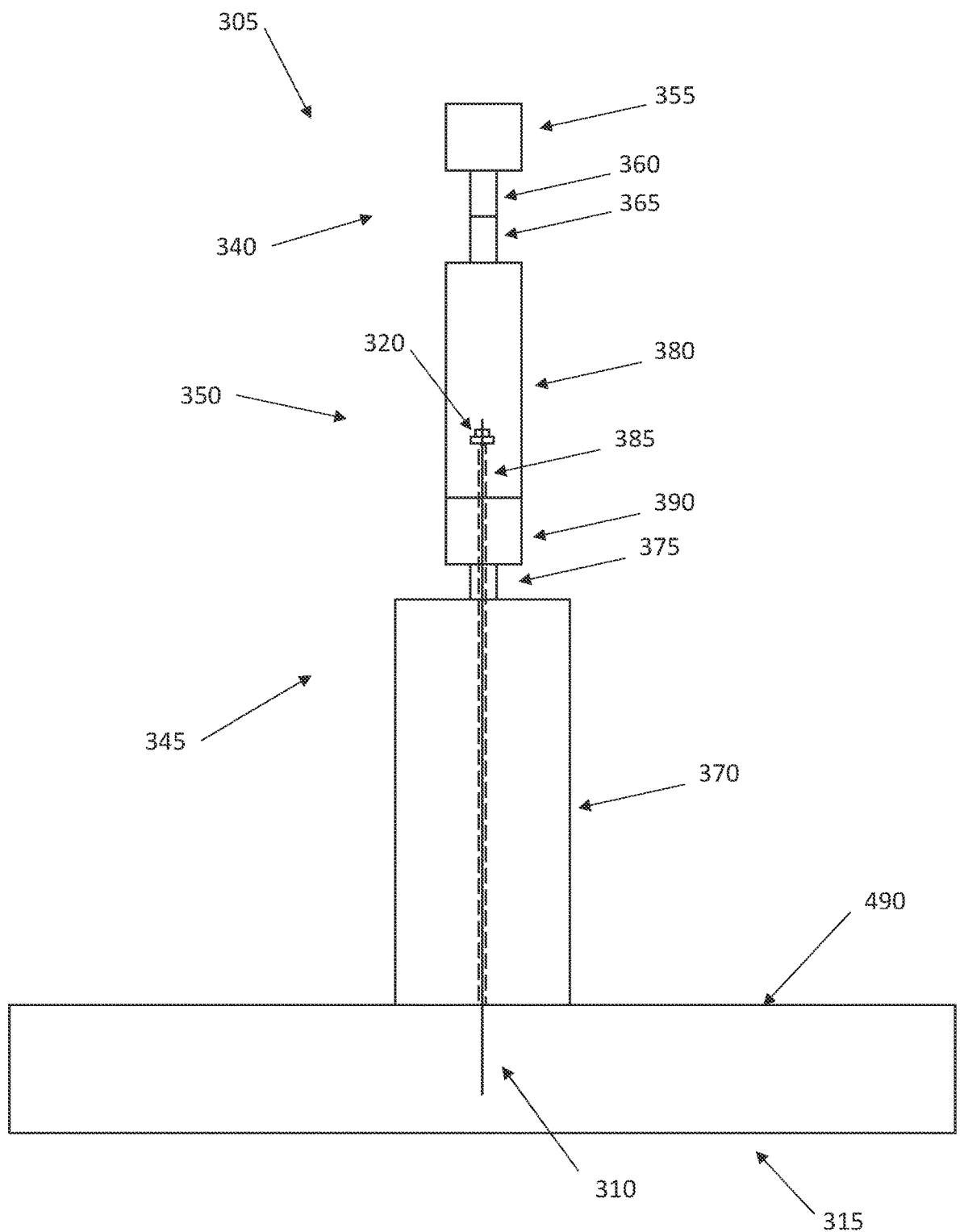
FIG. 11 is a side illustration of at least some exemplary embodiments of the present disclosure.

At step 615, core member 370 may be installed over elongated member 310 so that core member 370 is received on elongated member 310 as illustrated in FIG. 11. Core adapter 375 may then be installed over elongated member 310 so that core adapter 375 is received on elongated member 310 as illustrated in FIG. 11. Core adapter 375 may be attached (e.g., removably attached) to core member 370. Shaft chuck 390 may then be installed over elongated member 310 so that shaft chuck 390 is received on elongated member 310 as illustrated in FIG. 11. Attachment assembly 435 of shaft chuck 390 may be attached (e.g., removably attached) to core adapter 375.

At step 620, inner shaft assembly 385 may be installed over elongated member 310 so that inner shaft assembly 385 is received on elongated member 310 as illustrated in FIG. 11. For example, collar member 480, plate member 475, urging member 465, and plate member 470 may be inserted on elongated member 455 from any suitable end in order to provide any desired configuration (e.g., to provide the configuration or order illustrated in FIG. 8). Elongated member 455 (e.g., with collar member 480, plate member 475, urging member 465, and plate member 470 being received on elongated member 455) may be inserted on elongated member 310. Elongated member 455 may be inserted on elongated member 310 so that elongated member 455 extends to a vicinity of a surface 490 of structural assembly 315. For example, elongated member 455 may abut surface 490 of structural assembly 315 when elongated member 455 is received on elongated member 310. Collar member 480 may be adjacent to and/or directly face cavity 445 of shaft chuck 390 when elongated member 455 is received on elongated member 310.

Fastener assembly 320 including washer 335 and fastener 330 may be attached to elongated member 310 to attach inner shaft assembly 385 to elongated member 310 as illustrated in FIG. 11. Fastener assembly 320 may be attached to the portion of elongated member 310 extending from inner shaft assembly 385 (e.g., extending from elongated member 455), for example as illustrated in FIG. 11.

At step 625, outer shaft assembly 380 may be inserted over inner shaft assembly 385 and elongated member 310, and attached to shaft chuck 390, for example as illustrated in FIG. 11. Protruding portion 400 of outer shaft assembly 380 may be fastened to protruding portion 430 of shaft chuck 390 via fasteners 420 being fastened through respective apertures 415 and 440.

At step 630, drill 355 may be attached to outer shaft assembly 380 via drill chuck 360 and drill adapter 365, for example as illustrated in FIG. 11. Drill adapter 365 may be attached to attachment member 405 of outer shaft assembly 380. Drill chuck 360 may be attached to drill 355, and drill chuck 360 may be attached to drill adapter 365.

Figure 12:
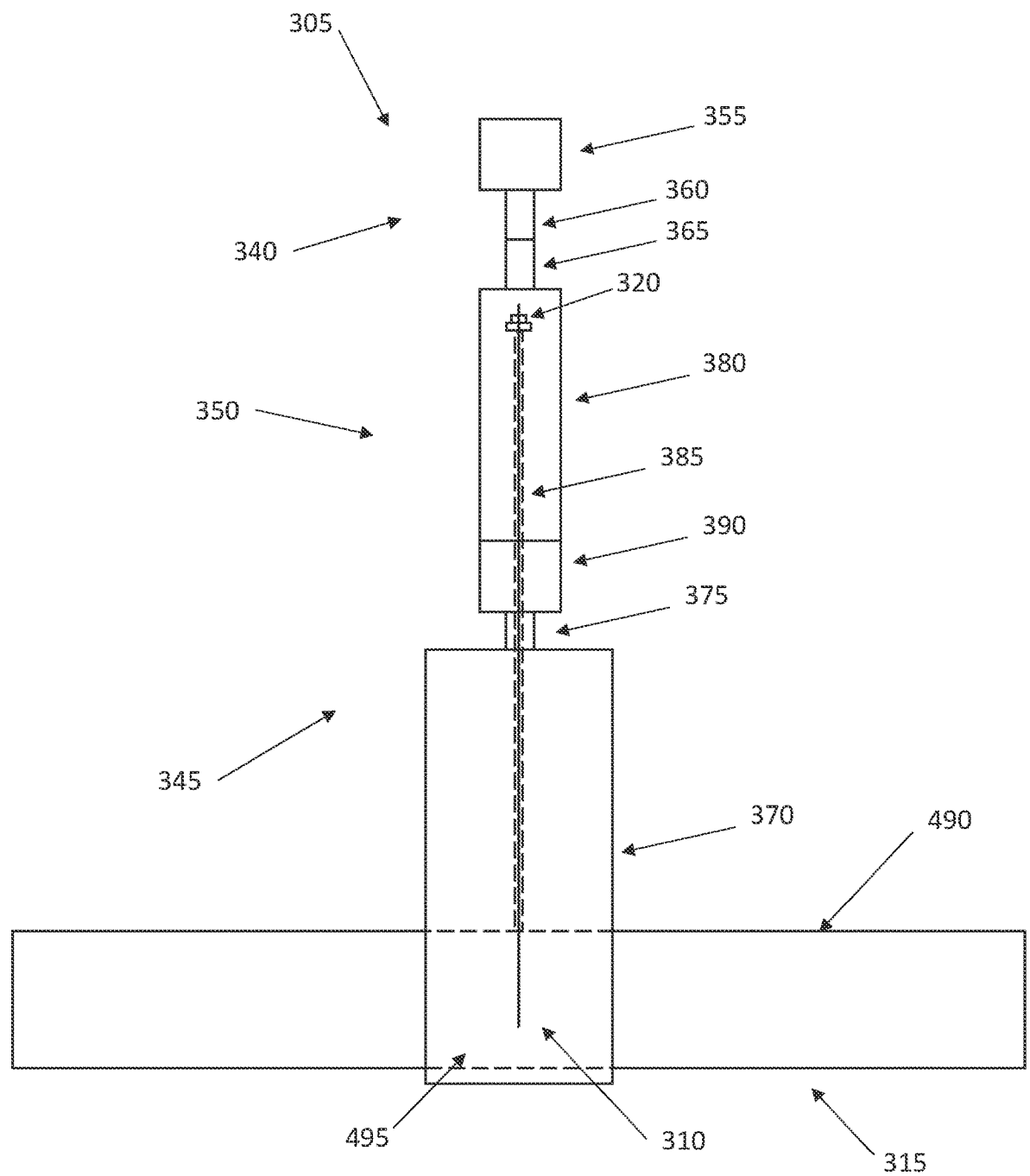
FIG. 12 is a side illustration of at least some exemplary embodiments of the present disclosure.

At step 635, drill 355 may be energized and assembly 305 may core a hole in or through structural assembly 315 as illustrated in FIGS. 11 and 12. In at least some exemplary embodiments, drill 355 may rotate components of drill assembly 340, shaft assembly 350, and core assembly 345 to rotate core member 370 to core a hole in or through structural assembly 315. As assembly 305 operates, core member 370 drills from surface 490 as illustrated in FIG. 11 and into or through structural assembly 315 as illustrated in FIG. 12. Inner shaft assembly 385 may remain substantially stationary relative to elongated member 310 and structural assembly 315 as the rest of the components of assembly 305 drill down into structural assembly 315 (e.g., based on elongated member 455 of inner shaft assembly 385 abutting surface 490 of structural assembly 315). As assembly 305 drills down into structural assembly 315, the length of the portion of elongated members 310 and 455 disposed in cavity 410 of outer shaft assembly 380 increases as illustrated in FIGS. 11 and 12, and urging member 465 may be compressed. For example as assembly 305 drills down into structural assembly 315, urging member 465 may be compressed by any suitable technique such as plate member 470 engaging a protrusion disposed at an interior surface of body member 395 or any other suitable mechanical interaction between inner shaft assembly 385 and outer shaft assembly 380. As plate member 470, urging member 465, plate member 475, and collar member 480 are urged toward cavity 445 of shaft chuck 390 and urging member 465 is compressed, collar member 480 is urged into cavity 445 and pressed against one or more wall members 450 of shaft chuck 390. As collar member 480 is received in cavity 445 and urged against one or more wall members 450, collar member 480 is compressed and applies compressive force against an exterior surface of elongated member 455, which compresses elongated member 455. Elongated member 455 may thereby apply a compressive force to elongated member 310 that may be disposed in cavity 485 of elongated member 455. Collar member 480 may thereby operate to compress or clamp elongated member 455 and elongated member 310 together as assembly 305 drills into or through (e.g., completes drilling into or through) structural assembly 315 for example as illustrated in FIG. 12. The length of elongated member 310 protruding from structural assembly 315 and extending into cavity 410 of outer shaft assembly 380 may be a length that may be predetermined prior to a drilling operation to provide for a desired point at which collar member 480 applies compressive force to elongated members 455 and 310 (e.g., to provide for compressive forces to be applied by collar member 480 when core member 370 has drilled through a desired amount or thickness of structural assembly 315).

Figure 13:
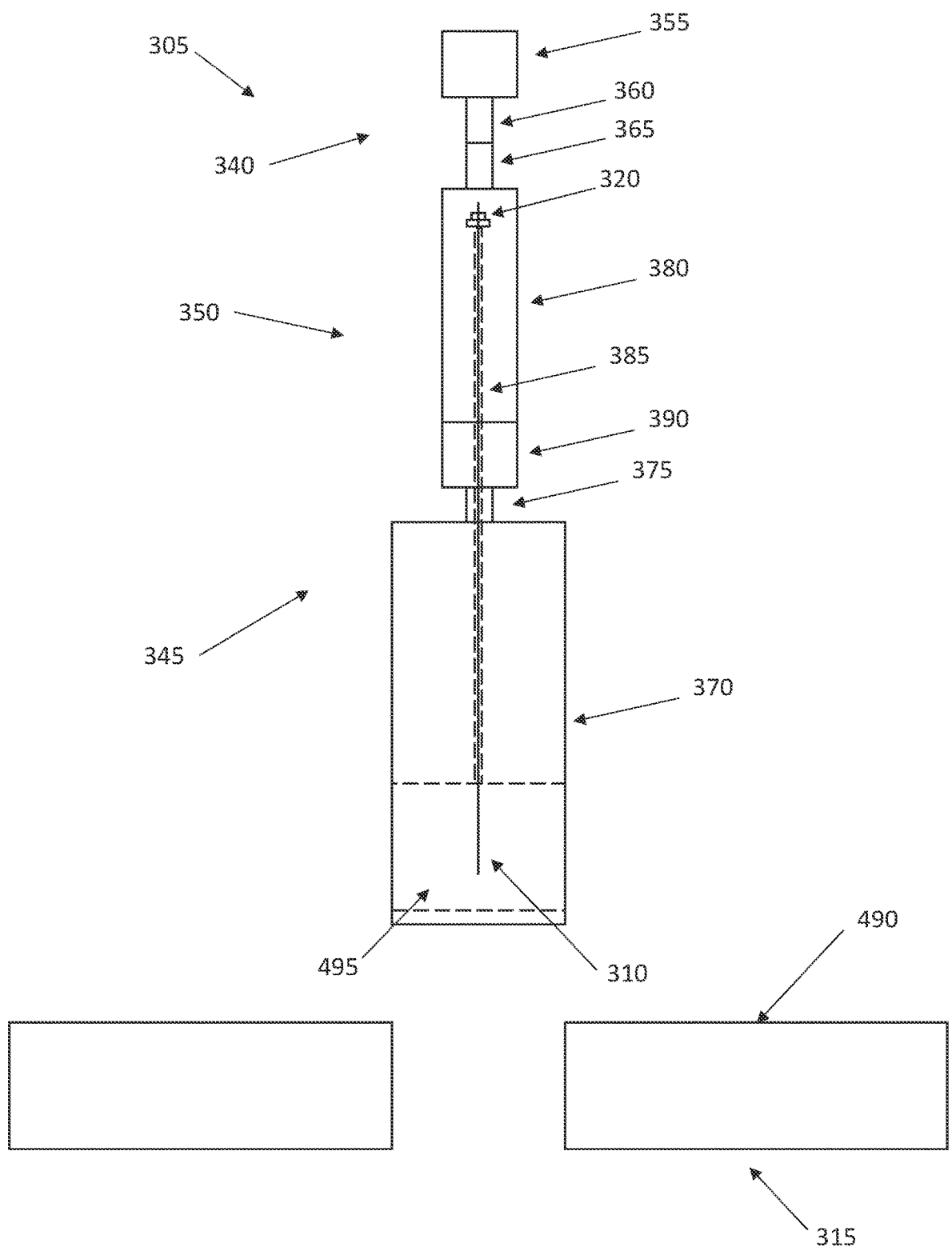
FIG. 13 is a side illustration of at least some exemplary embodiments of the present disclosure.

At step 640, assembly 305 may be retracted, for example moving from the position illustrated in FIG. 12 to the position illustrated in FIG. 13. During retraction, a portion of structural assembly 315 (e.g., a core 495 including elongated member 310) is removed from structural assembly 315. Core 495 may be for example a cylindrical portion (e.g., or any other suitable shape) corresponding to a cross-section of core member 370. During retraction, collar member 480 continues to compress or clamp elongated member 455 and elongated member 310 together. In at least some exemplary embodiments during extraction, collar member 480 maintains compression of elongated member 455 (e.g., elongated 455 engages fastener assembly 320, which is connected to elongated member 310, which results in elongated member 310 retracting with core 495 attached). As elongated member 310 remains drilled and adhered (e.g., epoxied and/or may also be adhered via an expansion anchor in lieu of epoxy) to core 495, and collar member 480 continues to compress or clamp elongated member 455 and elongated member 310 together, core 495 is retained in core member 370 as assembly 305 is retracted (e.g., as opposed to core 495 falling out of core member 370). For example, the drilled and epoxied connection maintains the attachment between core 495 and elongated member 310 during retraction, and the compression from collar member 480 maintains the attachment between elongated members 310 and 455 during retraction, so that core 495 remains attached to assembly 305. Core 495 may then be removed from assembly 305 and moved to a desired location by users of system 300. In at least some exemplary embodiments, reversing drill 355 may not release the pressure that collar member 480 is placing on elongated member 455 (e.g., by removing fastener 420 from protruding portions 400 and 430 then urging member 465 and plate members 470 and 475 would release pressure on collar member 480, which would then release pressure on elongated member 455). Also for example in at least some exemplary embodiments, drill 355 may be reversed or removed to release compression from urging member 465, which may allow collar member 480 to be removed from cavity 445 of shaft chuck 390, thereby releasing the compressing or clamping force between elongated members 310 and 455. Also for example during disassembly of assembly 305 (e.g., which may be substantially reverse to above steps 610 through 630), inner shaft assembly 385 and elongated member 310, which remains attached to core 495, may be removed from each other. A user of system 300 may then move core 495 with attached elongated member 310 to a desired location (e.g., to perform testing). Elongated member 310 may be cut and/or removed from core 495 if desired. Process 600 ends at step 645.

In at least some exemplary embodiments, the exemplary disclosed system, apparatus, and method may include a drilling adapter such as a concrete core drilling adapter configured to retain a core in a bit for extraction of the core. For example, the exemplary disclosed system, apparatus, and method may include a modified core drill shaft that attaches to a core bit and prevents a core from dropping out of the drill.

In at least some exemplary embodiments, the exemplary disclosed method for removing a portion of a structure may include attaching a first elongated member (e.g., elongated member 310) to the portion of the structure, receiving a second elongated member (e.g., elongated member 455) of a drilling assembly with the first elongated member, drilling into the structure with the drilling assembly while receiving the second elongated member with the first elongated member, and removing the portion of the structure that is attached to the first elongated member while urging the first elongated member with the second elongated member. Urging the first elongated member with the second elongated member may include urging a collar member disposed on the second elongated member into a cavity disposed in the drilling assembly. The collar member may compress the second elongated member when the collar member is urged into the cavity, and the second elongated member may compress the first elongated member that is received in the second elongated member. The collar member may be a collet, the first elongated member may be a rod, and the second elongated member may be a hollow structural member configured to receive the rod. Attaching the first elongated member to the portion of the structure may include drilling and epoxying the first elongated member, which may be a threaded rod, into the structure that may be a concrete structure. Drilling into the structure with the drilling assembly while receiving the second elongated member with the first elongated member may include coring with a core member into the structure, the core member being attached to an outer shaft assembly that may include a cavity in which the first elongated member and the second elongated member are disposed during drilling. The first elongated member and the second elongated member may remain substantially stationary relative to the structure during drilling while the core member drills into the structure and the outer shaft assembly moves toward the structure during drilling. Removing the portion of the structure while urging the first elongated member with the second elongated member may include clamping the first elongated member with the second elongated member and removing the portion of the structure that is drilled and adhered to the first elongated member.

In at least some exemplary embodiments, the exemplary disclosed drilling assembly may be configured to be received by a first elongated member (e.g., elongated member 310) attached to a portion of a structure and to remove the portion of the structure. The exemplary disclosed drilling assembly may include a second elongated member (e.g., elongated member 455) including a first cavity (e.g., cavity 485) configured to receive the first elongated member, an outer shaft assembly (e.g., outer shaft assembly 380) including a second cavity (e.g., cavity 410) configured to receive the second elongated member, a shaft chuck (e.g., shaft chuck 390) that may be removably attachable to the outer shaft assembly and that includes a third cavity (e.g., cavity 445), and a collar member that may be disposed on the second elongated member and that may be configured to be received in the third cavity. A tapered wall member of the shaft chuck may form the third cavity that is tapered, and the collar member may be tapered to fit into the third cavity with exterior surfaces of the collar member abutting against the tapered wall member when the collar member is received in the third cavity. The exemplary disclosed drilling assembly may include a drill that may be attached to the outer shaft assembly via a drill chuck and a drill adapter. The exemplary disclosed drilling assembly may also include a core bit that may be attached to the shaft chuck via a core adapter. The exemplary disclosed drilling assembly may further include a plurality of washers and a spring that may be disposed on the second elongated member, the spring configured to urge the collar member into the third cavity. The spring may be disposed between the plurality of washers, and the collar member may be a collet disposed between one of the plurality of washers and the third cavity when the second elongated member is received in the second cavity and the shaft chuck is removably attached to the outer shaft assembly. The second elongated member may include a protrusion that may be disposed in the second cavity when the second elongated member is received by the second cavity. The shaft chuck may include a first flange that may be configured to be removably fastened to a second flange of the outer shaft assembly.

In at least some exemplary embodiments, the exemplary disclosed method for removing a portion from a concrete structure may include drilling and epoxying a threaded rod to the portion of the concrete structure, receiving an elongated member (e.g., elongated member 455) of a drilling assembly with the threaded rod, coring into the concrete structure with the drilling assembly while receiving the elongated member with the threaded rod, and removing the portion of the concrete structure that is attached to the threaded rod while clamping the threaded rod with the elongated member. The exemplary disclosed method may further include removably fastening the elongated member to the threaded rod by threading a nut to a portion of the threaded rod extending out of the elongated member when the elongated member is received on the threaded rod. Coring into the concrete structure with the drilling assembly while receiving the elongated member with the threaded rod may include coring with a core member into the concrete structure, the core member being attached to an outer shaft assembly that includes a cavity in which the elongated member and the threaded rod are disposed during drilling. The threaded rod and the elongated member may remain substantially stationary relative to the concrete structure during coring while the core member cores into the concrete structure and the outer shaft assembly moves toward the concrete structure during coring.

The exemplary disclosed system, apparatus, and method may provide an efficient and effective technique for extracting a core. The exemplary disclosed system, apparatus, and method may prevent an extracted core from falling into an area below the extraction location. For example, the exemplary disclosed system, apparatus, and method may extract and retain a core, thereby preventing the core from falling into an area carrying traffic or having other vulnerabilities to falling objects such as a core dropping from an extraction location.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. A method for removing a portion of a structure, comprising:
   attaching a first elongated member to the portion of the structure;
   receiving a second elongated member of a drilling assembly with the first elongated member;
   drilling into the structure with the drilling assembly while receiving the second elongated member with the first elongated member; and
   removing the portion of the structure that is attached to the first elongated member while urging the first elongated member with the second elongated member, wherein removing the portion of the structure while urging the first elongated member with the second elongated member includes clamping the first elongated member with the second elongated member and removing the portion of the structure that is drilled and adhered to the first elongated member.

2. The method of claim 1, wherein urging the first elongated member with the second elongated member includes urging a collar member disposed on the second elongated member into a cavity disposed in the drilling assembly.

3. The method of claim 2, wherein the collar member compresses the second elongated member when the collar member is urged into the cavity, and the second elongated member compresses the first elongated member that is received in the second elongated member.

4. The method of claim 2, wherein the collar member is a collet, the first elongated member is a rod, and the second elongated member is a hollow structural member configured to receive the rod.

5. The method of claim 1, wherein attaching the first elongated member to the portion of the structure includes drilling and epoxying the first elongated member, which is a threaded rod, into the structure that is a concrete structure.

6. The method of claim 1, wherein drilling into the structure with the drilling assembly while receiving the second elongated member with the first elongated member includes coring with a core member into the structure, the core member being attached to an outer shaft assembly that includes a cavity in which the first elongated member and the second elongated member are disposed during drilling.

7. The method of claim 6, wherein the first elongated member and the second elongated member remain substantially stationary relative to the structure during drilling while the core member drills into the structure and the outer shaft assembly moves toward the structure during drilling.

8. A method for removing a portion from a concrete structure, comprising:

drilling and epoxying a threaded rod to the portion of the concrete structure;

receiving an elongated member of a drilling assembly with the threaded rod;

coring into the concrete structure with the drilling assembly while receiving the elongated member with the threaded rod; and removing the portion of the concrete structure that is attached to the threaded rod while clamping the threaded rod with the elongated member.

9. The method of claim 8, further comprising removably fastening the elongated member to the threaded rod by threading a nut to a portion of the threaded rod extending out of the elongated member when the elongated member is received on the threaded rod.

10. The method of claim 8, wherein coring into the concrete structure with the drilling assembly while receiving the elongated member with the threaded rod includes coring with a core member into the concrete structure, the core member being attached to an outer shaft assembly that includes a cavity in which the elongated member and the threaded rod are disposed during drilling.

11. The method of claim 10, wherein the threaded rod and the elongated member remain substantially stationary relative to the concrete structure during coring while the core member cores into the concrete structure and the outer shaft assembly moves toward the concrete structure during coring.

12. A method for removing a portion of a structure, comprising:

attaching a first elongated member to the portion of the structure;

receiving a second elongated member of a drilling assembly with the first elongated member, wherein urging the first elongated member with the second elongated member includes urging a collar member disposed on the second elongated member into a cavity disposed in the drilling assembly;

drilling into the structure with the drilling assembly while receiving the second elongated member with the first elongated member; and removing the portion of the structure that is attached to the first elongated member while urging the first elongated member with the second elongated member.

\* \* \* \* \*